United States Patent [19]

Drori

[11] 4,045,345
[45] Aug. 30, 1977

[54] SELF-FLUSHING FILTER

[76] Inventor: Mordeki Drori, 89 Zahal Street, Kiron, Israel

[21] Appl. No.: 727,859

[22] Filed: Sept. 29, 1976

[30] Foreign Application Priority Data

July 30, 1976 Israel .................................. 50171

[51] Int. Cl.² .......................................... B01C 29/38
[52] U.S. Cl. .................................. 210/107; 210/108; 210/355
[58] Field of Search ........................ 210/107, 108, 355

[56] References Cited

U.S. PATENT DOCUMENTS

| | | | |
|---|---|---|---|
| 2,422,735 | 6/1947 | Guarnia | 210/355 |
| 3,574,509 | 4/1971 | Zentis et al. | 210/107 |
| 3,717,252 | 2/1973 | Picard | 210/108 |
| 3,959,140 | 5/1976 | Legaas | 210/107 |

*Primary Examiner*—John Adee
*Attorney, Agent, or Firm*—Benjamin J. Barish

[57] ABSTRACT

An in-line self-flushing filter comprises a cylindrical filter body within a housing, a rotatable member defining a purging chamber having an inlet opening close to and facing the cylindrical surface of the filter body, a purging conduit fixed to the rotary member, and a valve between the purging chamber and the purging conduit. The latter valve is normally closed but is automatically opened by a diaphram sensor sensing the difference in pressure between the filter inlet and outlet to establish communication between the purging chamber and purging conduit and thereby to effect a reverse flow of the fluid through the filter body into the purging chamber and out through the purging conduit. The outlet end of the purging conduit is eccentric to the axis of rotation of the rotatable member so as to rotate same by the reaction force of the fluid exiting from the purging conduit, and thereby to cause the inlet opening of the rotatable member to sweep along the complete cylindrical surface of the filter body.

9 Claims, 4 Drawing Figures

SELF-FLUSHING FILTER

RELATED APPLICATIONS

This application is related to my U.S. Pat. application Ser. No. 715,544 filed Aug. 18, 1976, and also to my U.S. Pat. application Ser. No. 727,860 filed Sept. 29, 1976

BACKGROUND OF THE INVENTION

The present invention relates to filters, and is particularly directed to a self-flushing filter which enables the filter to be easily or automatically cleaned.

Filters, such as those included in water irrigation systems, require periodic cleaning. This usually involves shutting-off the supply line, dismantling the filter, cleaning its parts, and then reassembling it. Such a procedure is very inconvenient, time-consuming and costly. A number of arrangements have been proposed for providing filters with a cleaning capability which does not require shutting-off the supply line, or dismantling the filter, but the known arrangements are generally very costly and/or inefficient.

SUMMARY OF THE INVENTION

According to the present invention, there is provided an easily-cleanable filter, comprising: a housing including an inlet connectable to an upstream fluid pipe and an outlet connectable to a downstream fluid pipe; a filter body disposed within the housing and having a cylindrical surface facing the inlet to intercept dirt particles in the fluid flowing in the forward direction through the filter body from the inlet to the outlet; a rotatable member defining a purging chamber having an inlet opening close to and facing the cylindrical surface of the filter body; a purging conduit fixed to the rotary member to rotate therewith; and valve means disposed between the purging chamber and purging conduit. The valve means are normally closed to block the flow of fluid from the purging chamber to the purging conduit but are openable to establish communication therebetween and thereby to cause the fluid to flow in the reverse direction through the filter body into the purging chamber and out through the purging conduit. The rotation of the rotatable member when the valve means are opened thus causes the purging chamber inlet opening to move along the cylindrical surface of the filter body as the reverse flow of fluid through the filter body flushes dirt particles from its cylindrical surface into said purging chamber and out through the purging conduit.

Conceivably, the invention could be incorporated in a filter wherein the valve means are manually opened and the purging chamber is manually rotated in order to clean the filter, in which case the filter could be conveniently cleaned without shutting-off the supply line and without dismantling it. In the preferred embodiment of the invention described below, however, the filter is self-cleaned automatically, by opening the valve means and rotating the purging chamber, whenever the filter body becomes so clogged with dirt that the pressure difference between the filter inlet and outlet rises to a predetermined value.

Thus, according to further aspects of the invention, the outlet end of the purging conduit is eccentric to the axis of rotation of the rotatable member so as to rotate same by the reaction force of the fluid exiting from the purging conduit. In the described embodiment, the purging conduit includes adjusting means external to the filter housing enabling its eccentric outlet end to be adjusted to vary the reaction force and thereby the speed of rotation of the rotatable member. Also, the filter includes a sensor sensing the pressure difference between the housing inlet and the housing outlet, and effective to automatically open said valve means when the pressure difference reaches a predetermined magnitude.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
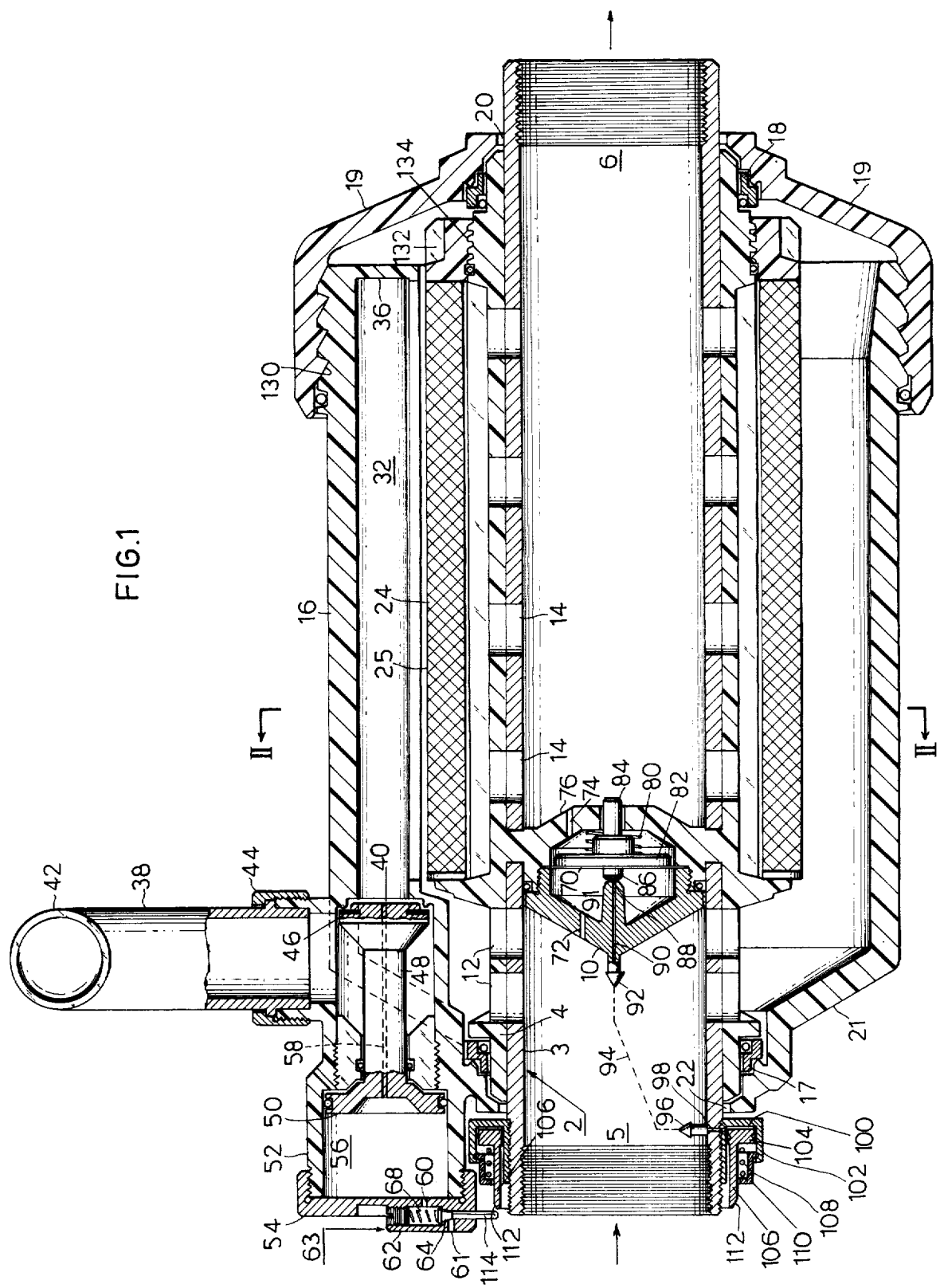
FIG. 1 is a longitudinal sectional view of one form of automatically self-cleanable filter constructed in accordance with the invention.
Figure 3:
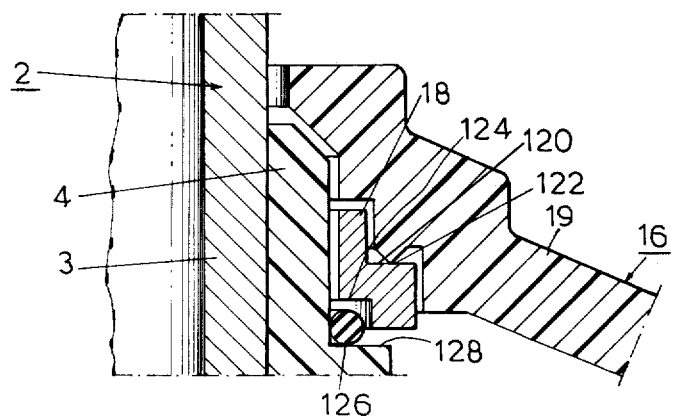
FIG. 3 is an enlarged fragmentary view illustrating the rotatable mounting of the outer cylindrical housing section of the filter of FIG. 1.
Figure 2:
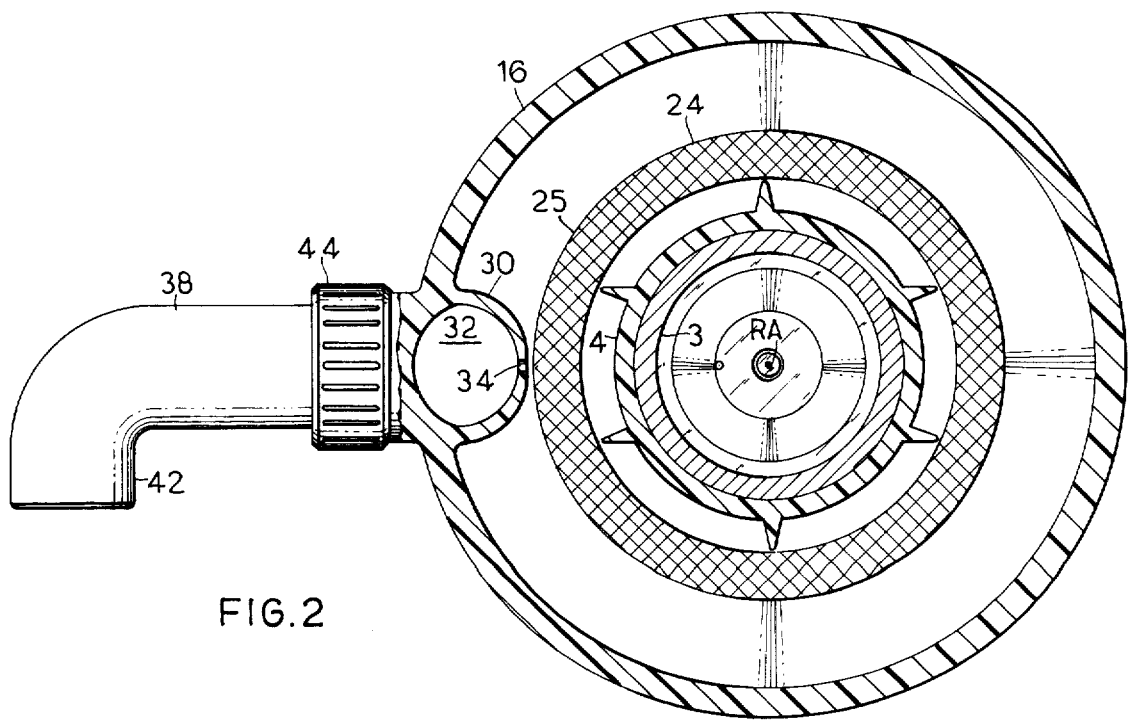
FIG. 2 is a transverse sectional view along line II—II of FIG. 1.

The filter illustrated in FIGS. 1–3 of the drawings is of the in-line type described, for example, in my U.S. Pat. application Ser. No. 715,544, but modified to include an automatic self-cleaning capability. It includes a housing comprising an inner tubular section 2 constituted of a rigid metal tube 3 and a plastic body 4 bonded thereto. The opposite ends of the metal tube 3 serve as the inlet 5 and outlet 6 of the filter housing and are adapted to be threadedly attached to the upstream and downstream pipes (not shown), respectively. A conical deflector 10 is fixed within the inner metal tube 3 between one group of holes 12 and a second group of holes 14 formed through the wall of the tubular section 2 at longitudinally-spaced locations.

The filter housing further includes an outer cylindrical section 16 which is radially spaced from th inner tubular section 2, and is rotatably mounted to that section by a pair of bearing rings 17, 18 disposed at the opposite ends of the outer section 16. Bearing rings 17, 18 permit the rotation of the outer housing section 16 with respect to the inner section 2, and also effect a seal between the two sections, as will be described more particularly below with respect to FIG. 3. One end of the outer housing section 16 threadedly receives a collar 19 having a large bore 20 for rotatably accommodating the fixed inner section 2, and the opposite end of the outer section 16 is formed with an end wall 21 also having a bore 22 for rotatably accommodating the fixed inner section 2.

A filter body 24 of substantially cylindrical form is disposed in the space between the fixed inner section 2 of the housing and its rotatable outer section 16, the latter section being coaxial to and radially spaced from the filter body.

It will be seen that the water, or other fluid, entering through inlet 5 of the inner tubular section 2 is deflected by deflector 10 to flow through holes 12, filter body 24, holes 14 back into the interior of the inner tubular section 2, and then out through outlet 6. This is the forward flow of the fluid through the filter. Further details of the construction and operation of such a filter may be found in the above-cited U.S. Pat. application Ser. No. 715,544.

The filter illustrated in FIGS. 1–3 is provided with an arrangement for automatically cleaning the filter body 24 when it becomes overly clogged with dirt particles, the cleaning operation being automatically initiated upon the sensing of this overly-clogged condition and continuing until the condition has been corrected.

For this purpose, the outer cylindrical housing section 16 of the filter is provided with an inwardly-depending curved wall 30 (see particularly FIG. 2) defining a purging chamber 32 extending the length of the filter body 24. Purging chamber 32 is formed with a narrow slot 34 along its length serving as an elongated inlet opening to the chamber, this inlet being close to and facing the outer cylindrical surface 25 of the filter body 24. One end of chamber 32 is closed by an end wall 36, and the opposite end of the chamber communicates with a purging conduit 38 via a circular opening or passageway 40. The outer end of purging conduit 38 is turned at a right-angle, as shown at 42, to be eccentric to the axis of rotation RA (FIG. 2) of housing section 16, so that any water issuing from the outlet end of the purging conduit will produce a reaction force tending to rotate the housing section 16 on its bearing rings 17, 18 about its rotational axis RA. The inner end of the purging conduit 38 is fixed to the outer housing section 16 by means of a thread nut 44.

A valve member 46 is seatable within opening 40 between purging chamber 32 and its purging conduit 38. Valve member 46 is fixed to one end of a stem 48. The opposite end of the stem carries a piston 50 movable within a cylinder 52 formed at a respective end of the outer housing section 16. Cylinder 52 is closed by a threaded cap 54 whereby a valve chamber 56 is defined by piston 50 movable within cylinder 52. A bore 58 formed through valve member 46, its stem 48, and piston 50, transmits to valve chamber 56 to pressure within the purging chamber 32. This chamber may also be vented to the atmosphere via an opening 60 formed in cover plate 54, and an opening 61 formed in another cylinder 62 of a pilot valve 63 whose valve member 64 is movable in its cylinder 62 to effect, or block, communication between opening 60 and opening 61 of the pilot valve. The pilot valve member 64 is formed with a conical seat that in its lowermost position, as urged by spring 68, it blocks communication between openings 60 and 61, but it may be moved to an upper position against spring 68 in order to establish communication between openings 60 and 61 and thereby to vent the main valve chamber 56 to the atmosphere.

Pilot valve 63 is automatically actuated to vent chamber 56 to the atmosphere by means of pressure-sensing means which senses the pressure difference between the inlet 5 and the outlet 6 of the filter housing, to automatically initiate a cleaning operation when the pressure difference exceeds a predetermined magnitude, thereby indicating that the filter body 24 is overly clogged with dirt.

The pressure-sensing means includes a diaphragm 70 disposed within deflector 10. Deflector 10 includes an opening 72 exposing the left face of the diaphragm to the pressure at the inlet side 5 of the filter housing. The opposite face of diaphragm 70 is exposed to the pressure at the outlet side 6 of the housing by means of another opening 74 formed through the rear wall 76 of the deflector. Diaphragm 70 is spring-urged towards the inlet side of the housing by means of a coil spring 80 interposed between rear wall 76 of the deflector and a circular disc 82 engaging or fixed to the respective face of the diaphragm. Disc 82 includes a guiding stem 84 passing through a central opening formed in rear wall 76 of deflector 10.

The opposite face of diaphragm 70 (i.e., that facing the inlet 5 side of the filter) carries a valve member 86 which is adapted to move into or out of engagement with respect to the mouth 88 of an axial bore 90 formed in a stem 91 of deflector 10. The opposite end of bore 90 is connected to a nipple 92 which receives a control line 94 leading to another nipple 96 carried internally of the inner tubular section 2 of the filter housing.

A bore 98 formed through the wall of housing section 2 leads from nipple 96 to a chamber 100 defined by an annular cylinder 102 threaded onto the inlet end of the filter housing, and an annular flange 104 of a sleeve 106 movable within cylinder 102 against a spring 108 interposed between annular flange 104 and a closure cap 110. The opposite end of sleeve 106 is formed with a cam surface 112 which is engageable with a stem 114 carried at the end of the pilot valve member 64. Thus, whenever chamber 100 is pressurized by the operation of the diaphragm sensor 70 as will be described below, sleeve 106 is moved outwardly to engage the lower end of stem 114 and thereby to move the pilot valve member 64 upwardly, to vent the main vlave chamber 56 to the atmosphere via openings 60 and 61.

The filter illustrated in FIGS. 1–3 operates as follows:

In the normal use of the filter, the water flowing through inlet 5 passes via openings 12 through the filter body 24, and exits via openings 14 through the outlet 6. So long as the filter, body 24 is reasonably clean, there is but a small drop in pressure during this forward flow of the water through the filter body, and therefore the pressure at the outlet 6 will be but slightly below that at the inlet 5. Diaphragm 70 senses the difference in pressure between the inlet and outlet, via openings 72, 74, respectively, and spring 80 is designed so that valve member 86 carried centrally of diaphragm 70 is in contact with mouth 88 of bore 90 at all times that the pressure difference between the inlet and outlet is below a predetermined amount, i.e. when the filter is reasonably clean. Accordingly, during this normal operation of the filter chamber 100 will not be pressurized, and pilot valve member 64 will be in the illustrated lower position whereby the main valve chamber 56 is not vented to the atmosphere. The pressure within chamber 56 with therefore be equal to that in the purging chamber 32, by virtue of bore 40 establishing communication between the two chambers. Because of the larger cross-sectional area of piston 50, compared to that of the main valve member 46, the main vlave member 46 will be seated in opening 40, as illustrated in FIG. 1, thereby blocking the flow of water from purging chamber 32 to the purging outlet conduit 38.

Thus, in this normal operation, the flow of water out through the purging conduit 38 will be blocked, and the filter will operate to filter out the dirt particles in the water flowing in the above-described forward direction through the filter from inlet 5 through outlet 6.

Now, as the dirt particles accumulate on the filter body 24, particularly on its outer cylindrical surface 25 facing the inlet 5, the outlet pressure drops, thereby increasing the difference in pressure between the inlet 5 and the outlet 6. When this pressure differences reaches a predetermined magnitude, diaphragm 70 flexes (rightwardly) such that its valve member 86 moves away from mouth 88 of bore 90. The inlet water pressure is now applied, via control line 94, to chamber 100, which causes sleeve 106 to move (leftwardly), whereby its outer tapered end 112 engages stem 114 of the pilot valve member 64, thereby raising it against spring 68. When this occurs, the main valve chamber 56 becomes vented to the atmosphere via openings 60, 61, so that the main valve member 46 now moves (leftwardly) away from opening 40, thereby establishing communication between purging chamber 32 and purging conduit 38. Since purging chamber 32 is now vented to the atmosphere via purging conduit 38, a reverse flow of water is produced from the outlet side 6 of the filter via openings 14, filter body 24, purging chamber 32 via its elongated inlet opening 34, and out through the purging conduit 38. This flushes the dirt particles from the filter body out through the purging chamber 32 and the purging conduit 38. In addition, the outflow of water through the purging conduit 38 produces a reaction force, by virtue of its eccentric outturned end 42, which causes the outer cylindrical housing section 16 to rotate on its bearing rings 17, 18. The purging chamber inlet 34 is thus caused to move along the complete outer cylindrical surface 25 of the filter body 24 as it flushes out the dirt particles from that surface as well as from within the filter body itself.

An important advantage in the arrangement described is that the force for rotating the outer cylindrical housing section 16, in order to effect the flushing of the complete cylindrical surface of the filter body 24, is produced by the flow of the water through the purging conduit 38 which is external to the filter housing. Thus, the amount of driving force, and thereby the rotational speed of the housing 16, can be easily varied, for example by loosening nut 44 to change the angle of the outturned end 42 of the purging conduit 38 with respect to the rotational axis RA, or to change the distance of the out-turned end 42 from the rotational axis.

It will be appreciated that vent openings 60, 61 in the main valve chamber 56 should be of larger cross-sectional area than bore 58 so as to cause the pressure within the main valve chamber 56 to quickly drop towards atmospheric pressure whenever the pilot valve 63 is actuated as described above. The reverse flushing of the filter body 24 would thus be initiated as soon as the pressure difference between the inlet 5 and outlet 6 of the filter reaches a predetermined maximum. It would be desirable to have the flushing continue for at least a short interval after the pressure difference drops to below the predetermined maximum so as to avoid overly-frequent initiation of the self-cleaning operation. This can be done by increasing the hysteresis of the system. One way of accomplishing this is by making bore 58 of very small diameter so that even when the sensor diaphragm 70 returns to its normally closed position and deactuates the pilot valve 64 to terminate the venting of chamber 56 to the atmosphere, it will take an interval of time before the pressure within the main valve chamber 56 again rebuilds up to the point where it returns the main valve 46 to its normally closed position seating within opening 40. During this time interval that the main valve remains open, the reverse flushing action continues, thereby assuring a more complete cleaning of the filter during each cleaning operation.

Another important feature in the arrangement illustrated in FIGS. 1 and 2 is the rotary mounting for the outer cylindrical housing section 16, which permits it to rotate with respect to the inner housing section 2 and also to effect a seal with the latter section. This is more particularly illustrated in the enlarged fragmentary view of FIG. 3, showing the rotary mounting at the right end of the filter, namely that between bearing ring 18 and cap 19 of the outer cylindrical housing section 16. The bearing ring 18 is of Z-shape in cross-section, including a flat face 120 engaging an annular pointed rib 122 formed on the inner face of housing section collar 19, and a second flat face 124 engaging a sealing ring 126 interposed between that face and a shoulder 128 formed in the metal tube 3 of the inner housing section 2. Thus, when the filter housing is pressurized by the water flowing therethrough, the pressure is applied to sealing ring 126 and face 124 of the bearing ring 18 in the outward (right, in FIG. 3) direction, causing the sealing ring 126 to effect a tight seal with respect to face 124 and the fixed inner section 2 of the housing. At the same time, this force presses face 120 of the bearing ring 18 firmly against the annular pointed rib 122 of collar 19 on the rotatable cylindrical housing section 16, thereby producing a low-friction line contact, and also a good seal, between the two members.

As indicated above, the bearing ring 17 rotatably mounting the opposite end of the cylindrical housing section 16 is of the same construction as bearing ring 18, and thereby produces a low-friction contact as well as a good seal at that end of the housing section 16. It will be further noted, from FIG. 1, that both bearing rings 17 and 18 are of the same diameter, thereby producing an equally-balanced outwardly-directed force with respect to the opposite ends of the rotatable housing section 16.

Even though the filter illustrated in FIGS. 1–3 is automatically self-cleanable whenever its filter body 24 becomes overly clogged with dirt particles, nevertheless it may be occasionally desirable to dismantle the filter and to effect a more thorough cleaning of its parts. This can also be conveniently done in the filter illustrated in FIGS. 1–3, by merely unthreading collar 19 (via its threads 130) from its outer rotatable housing section 16 and moving the collar (rightwardly) over the downstream pipe (not shown) coupled to the outlet 6 of the filter, and then loosing or unthreading nut 132 from threads 134 of the inner housing section 2. The filter body 24 is preferably made of a plurality of filter discs, as described in the above-cited patent application, which discs are thereby freed so that they can be thoroughly washed by a water spray applied to them and to the interior of the dismantled filter.

Figure 4:
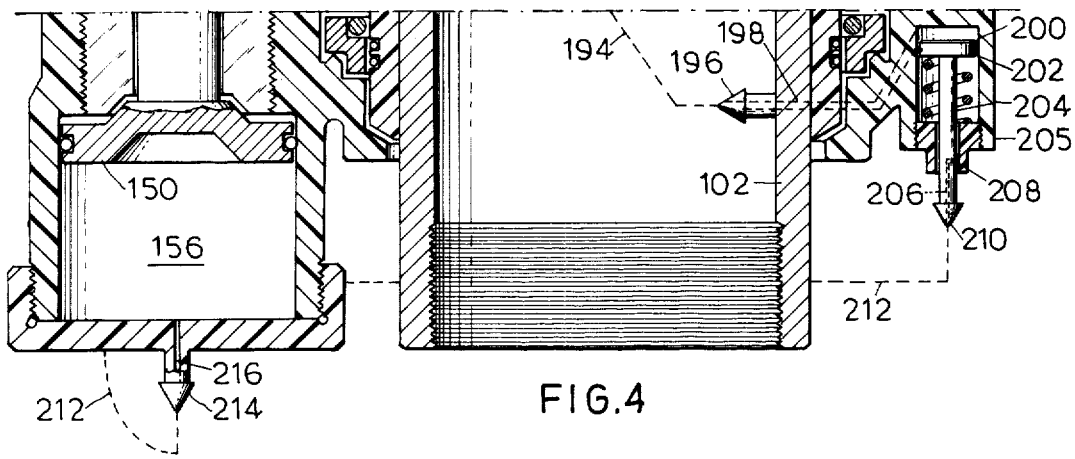
FIG. 4 illustrates a modification of the filter of FIG. 1.

Many variations may be made in the filter illustrated in FIGS. 1–3. FIG. 4 illustrates one variation, wherein the pressure produced upon the sensing of a predetermined pressure difference between the inlet and outlet of the filter (instead of being transmitted to compartment 100 which displaces sleeve 106 to actuate the pilot valve 63 in order to vent the main valve chamber 56 as described above) is applied (in FIG. 4) to a chamber 200 which directly displaces a pilot valve member 202 carried on a stem 204. The latter moves in a cylinder 205 and has a bore 206 through its outer end, the bore terminating at its inner end in a radial opening 208. The end of stem 204 carries a nipple 210 connected by a control line 212 to another nipple 214 of a vent opening 216 in the main valve chamber 156 in which piston 150 moves. Thus, when the pilot valve chamber 200 is pressurized, the pilot valve member 202 is displaced until radial opening 208 in the stem of the pilot valve projects outwardly of cylinder 205, at which time the main valve control chamber 156 is vented to the atmosphere via vent opening 216, control line 212, bore 206, and opening 208. As described above, as soon as chamber 156 is vented to the atmosphere, the main control valve (46 in FIG. 1) is displaced leftwardly away from opening 40, thereby establishing communication between the purging chamber 32 and purging conduit 38, initiating a flushing action through the filter body 24.

Many other variations, modifications and applications of the illustrated embodiment of the invention will be apparent.

What is claimed is:

1. A self-flushing filter, comprising: a housing including an inlet connectable to an upstream fluid pipe, and an outlet connectable to a downstream fluid pipe; a filter body disposed within the housing and having a cylindrical surface facing the inlet to intercept dirt particles in the fluid flowing in the forward direction through the filter body from the inlet to the outlet; a rotatable member defining a purging chamber having an inlet opening close to and facing said cylindrical surface of the filter body; a purging conduit fixed to the rotary member to rotate therewith; and valve means disposed between said purging chamber and purging conduit; said valve means being normally closed to block the flow of fluid from said purging chamber to the purging conduit but being openable to establish communication therebetween and thereby to cause the fluid to flow in the reverse direction through the filter body into the purging chamber and out through the purging conduit, whereby rotation of the rotatable member when the valve means are opened causes the purging chamber inlet opening to move along the cylindrical surface of the filter body as said reverse flow of fluid through the filter body flushes dirt particles from its cylindrical surface into said purging chamber and out through the purging conduit.

2. A filter according to claim 1, wherein the outer surface of the filter body constitutes said cylindrical surface facing the housing inlet, and wherein said housing includes a fixed inner section and a rotatable outer cylindrical section coaxial to and radially spaced from said outer cylindrical surface of the filter body, said rotatable member defining the purging chamber being fixed to the inner surface of said outer cylindrical section and rotatable therewith.

3. A filter according to claim 1, wherein the outlet end of the purging conduit is eccentric to the axis of rotation of the rotatable member so as to rotate same by the reaction force of the fluid exiting from the purging conduit.

4. A filter according to claim 3, wherein said purging conduit includes adjusting means external to the filter housing enabling its eccentric outlet end to be adjusted to vary the reaction force and thereby the speed of rotation of the rotatable member.

5. A filter according to claim 1, further including a sensor sensing the pressure difference between the housing inlet and the housing outlet, and effective to automatically open said valve means when the pressure difference reaches a predetermined magnitude.

6. A filter according to claim 1, wherein said valve means comprises a main valve disposed between said purging chamber and purging conduit, and a pilot valve acuatable to open said main valve.

7. A filter according to claim 6, wherein said main valve comprises a stem, a valve member fixed to one end of the stem, said piston being movable within a valve cylinder and defining a valve chamber with the end wall of the cylinder, said valve member being seatable in an opening between said purging chamber and purging conduit when the main valve is closed, and being movable away from said opening to establish communication between said purging chamber and purging conduit when the main valve is open, the cross-sectional area of said valve member being less than that of said piston, said stem including a bore therethrough for transmitting the pressure within the purging chamber to the valve chamber to maintain the valve member normally closed, said pilot valve including means for venting said valve chamber to the atmosphere to open said main valve.

8. A filter according to claim 1, wherein said rotatable member is rotatably mounted by means of a bearing ring between each and thereof and a fixed section of the housing, the inwardly facing face of each bearing ring including a sealing ring effective to produce a seal between same and the fixed section of the housing, the outwardly facing face of each bearing ring contacting the respective end of the rotatable member along an annular line ane being pressed into sealing contact therewith by the pressure of the fluid within the filter.

9. A filter according to claim 8, wherein said fixed section of the housing includes an inner rigid tube having the housing inlet at one end, the housing outlet at the opposite end, a deflector within the inner rigid tube, a first opening through the inner rigid tube wall at the inlet side of said deflector, and a second opening through the inner rigid tube wall at the outlet side of said deflector, said filter body being of cylindrical configuration and disposed over said second opening.

* * * * *